US008880606B2

(12) United States Patent
Aldunate et al.

(10) Patent No.: US 8,880,606 B2
(45) Date of Patent: Nov. 4, 2014

(54) MULTI-MODAL, GEO-TEMPO COMMUNICATIONS SYSTEMS

(75) Inventors: Roberto Aldunate, Champaign, IL (US); Gregg E Larson, Champaign, IL (US)

(73) Assignee: Applied Research Associates, Inc., Albuquerque, NM (US)

( * ) Notice: Subject to any disclaimer, the term of this patent is extended or adjusted under 35 U.S.C. 154(b) by 0 days.

(21) Appl. No.: 13/594,436

(22) Filed: Aug. 24, 2012

(65) Prior Publication Data

US 2012/0327112 A1  Dec. 27, 2012

Related U.S. Application Data

(62) Division of application No. 12/558,758, filed on Sep. 14, 2009, now Pat. No. 8,275,834.

(51) Int. Cl.
*G06F 15/16* (2006.01)
*H04L 29/08* (2006.01)
*H04L 29/06* (2006.01)
*G06F 17/00* (2006.01)
*G06F 15/00* (2006.01)
*G06F 7/00* (2006.01)

(52) U.S. Cl.
CPC .............. *H04L 67/36* (2013.01); *H04L 67/38* (2013.01); *H04L 67/18* (2013.01)
USPC ............ 709/204; 709/203; 709/246; 706/47; 706/60; 701/400; 704/200; 707/607

(58) Field of Classification Search
USPC ................. 709/203, 204, 246; 706/47, 60; 701/400; 704/200; 707/607
See application file for complete search history.

(56) References Cited

U.S. PATENT DOCUMENTS

| 5,898,421 A | 4/1999 | Quinn |
| 6,371,616 B1 | 4/2002 | Doany et al. |
| 6,375,572 B1 | 4/2002 | Masuyama et al. |
| 6,701,294 B1 * | 3/2004 | Ball et al. ................ 704/257 |
| 7,000,469 B2 | 2/2006 | Foxlin et al. |

(Continued)

FOREIGN PATENT DOCUMENTS

| EP | 2005168892 | 6/2005 |
| EP | 2005224287 | 8/2005 |
| WO | 2007067720 A2 | 6/2007 |
| WO | 2008157061 A1 | 12/2008 |

*Primary Examiner* — David Lazaro
*Assistant Examiner* — Vitali Korobov
(74) *Attorney, Agent, or Firm* — Dinsmore & Shohl LLP; Monika J. Hussell, Esq.

(57) ABSTRACT

Disclosed is a flexible, multi-modal system useful in communications among users, capable of synchronizing real world and augmented reality, wherein the system is deployed in centralized and distributed computational platforms. The system comprises input devices to generate signals representing speech, gestures, pointing direction, and location of a user, and transmit the same to a multi-modal interface. A plurality of agents and one or more databases are integrated into the system, where at least some of the agents receive signals from the multi-modal interface, translate the signals into data, compare the same to a database, generate signals representing meanings as defined by the database, and transmit the signals to the multi-modal interface. Finally, a plurality of output devices are associated with the system to receive and process signals from the multi-modal interface, some of said signals representing messages to the user to be communicated by means of an output device.

7 Claims, 8 Drawing Sheets

(56) References Cited

U.S. PATENT DOCUMENTS

| | | |
|---|---|---|
| 7,092,928 B1 * | 8/2006 | Elad et al. ............ 706/60 |
| 7,158,112 B2 | 1/2007 | Rosenberg et al. |
| 7,558,734 B1 * | 7/2009 | Stewart et al. ............ 704/270 |
| 7,587,668 B2 * | 9/2009 | Bala ............ 715/234 |
| 7,769,897 B2 * | 8/2010 | Debruin et al. ............ 709/246 |
| 7,912,984 B2 * | 3/2011 | Debruin et al. ............ 709/246 |
| 8,027,945 B1 * | 9/2011 | Elad et al. ............ 706/47 |
| 2002/0152620 A1 | 10/2002 | Lemp, III |
| 2003/0149803 A1 * | 8/2003 | Wilson ............ 710/1 |
| 2003/0218546 A1 | 11/2003 | Lemp, III |
| 2005/0030189 A1 | 2/2005 | Foster |
| 2005/0046581 A1 | 3/2005 | Lemp, III |
| 2005/0250085 A1 | 11/2005 | Lemp, III et al. |
| 2005/0253055 A1 | 11/2005 | Sprague et al. |
| 2005/0268473 A1 | 12/2005 | Lemp, III et al. |
| 2006/0082736 A1 | 4/2006 | Grueger |
| 2006/0168831 A1 | 8/2006 | Lemp, III et al. |
| 2006/0197753 A1 | 9/2006 | Hotelling |
| 2006/0244621 A1 | 11/2006 | Lemp, III |
| 2007/0064207 A1 | 3/2007 | Rodriguez, Jr. et al. |
| 2007/0097335 A1 | 5/2007 | Dvorkis et al. |
| 2007/0130524 A1 | 6/2007 | Abbott et al. |
| 2007/0176851 A1 | 8/2007 | Willey et al. |
| 2007/0193044 A1 | 8/2007 | Lemp, III et al. |
| 2007/0219711 A1 * | 9/2007 | Kaldewey et al. ............ 701/208 |
| 2007/0282564 A1 | 12/2007 | Sprague et al. |
| 2007/0283583 A1 | 12/2007 | Subbiondo et al. |
| 2009/0171663 A1 * | 7/2009 | Badt et al. ............ 704/257 |
| 2009/0259674 A1 * | 10/2009 | Griffin et al. ............ 707/101 |

* cited by examiner

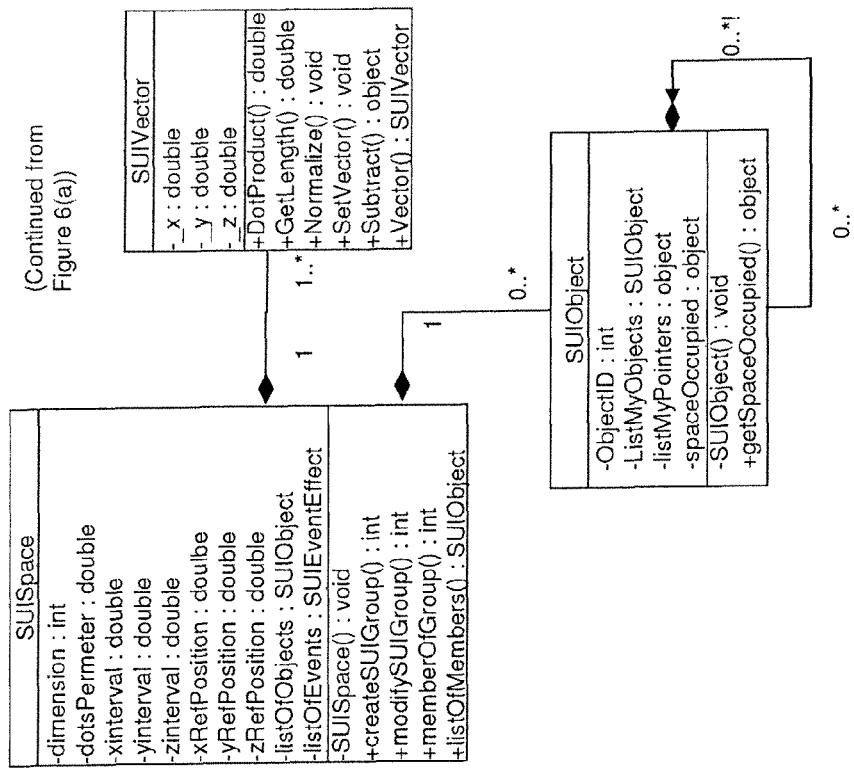
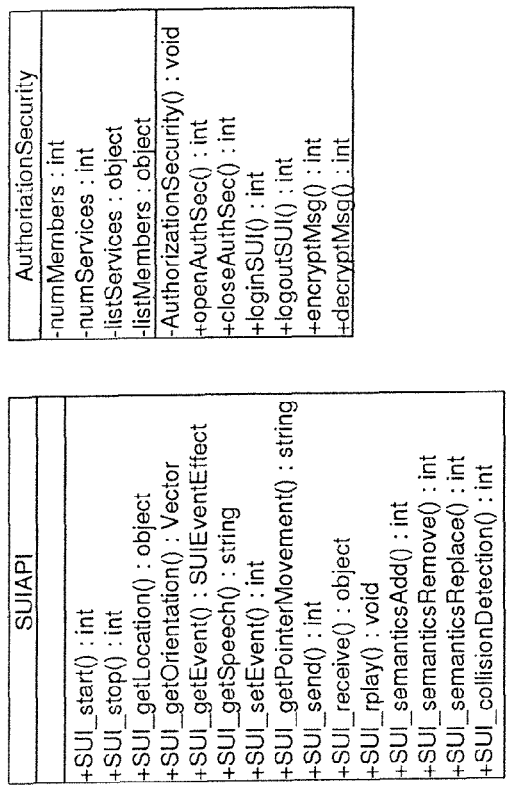
Figure 6(b)

MULTI-MODAL, GEO-TEMPO COMMUNICATIONS SYSTEMS

BACKGROUND OF THE INVENTION

The present invention regards systems for facilitating crucial communications among mobile users by means of multi-modal, geo-referenced and time-referenced messages, as well as communications to and from, and remote control of, stationary and mobile objects. The systems allow users to create, annotate, transmit, retrieve and review voice, iconic, visual, tactile, and text messages, and/or in some embodiments to control apparatus and systems. Each message may include a geographic marker based upon its place of origination (e.g., GPS coordinates) and/or area of dissemination, and further may include a time-reference regarding the time of creation and/or duration of transmission, receipt or review. In some embodiments, the present invention allows users to "tag" or otherwise identify certain structures or geographical features at a location, and send messages regarding the tagged structure or feature to other individuals who might have the structure or geographical feature in their field of view or near their geographical location.

The systems of the present invention are designed to support human interactions occurring in reduced geographical locations, including environments like battlefields, first response operations, and daily life social networking, and provide dynamic communications systems where mobile users may improve their performance by communicating in association with their physical surroundings. Components of the systems are designed to provide flexibility to cope with environments where different profiles/roles, levels of expertise and knowledge are present among the mobile users. Furthermore, some components are designed to support basic human analogical communication, such as gestures, tactile sensing, visual icons, and verbal commands, thereby providing users with an intuitive way to support and extend their communications. In some embodiments, the devices and systems augment the real world perceived by users by incorporating geo-tempo-registered data overlaid on see-through displays.

The systems further aim to support Stigmergy, a form of communication where the environment plays a fundamental role in the communication process. By supporting the annotation of geo-tempo-registered, multi-modal messages, the systems will facilitate the coordination, communication, and awareness among mobile users who most likely have limited access to both global information and information processing capabilities.

Furthermore, the systems preferably include an agent-based architecture to address scalability, high performance, and fault tolerance features, and may be used in distributed or centralized computing environments.

Although the applications of the present invention are focused primarily on enabling communication through and with highly dynamic environments, they can be extended to other domains, like video games and virtual reality, and for everyday applications.

BRIEF DESCRIPTION OF THE DRAWINGS

The accompanying drawings, which are incorporated in and form a part of this specification, illustrate embodiments of the invention and, together with the description, serve to explain the principles of the invention.

FIGS. 6(a) and 6(b) are a UML class diagram of an embodiment of the present invention.

DETAILED DESCRIPTION OF THE INVENTION

Figure 1:
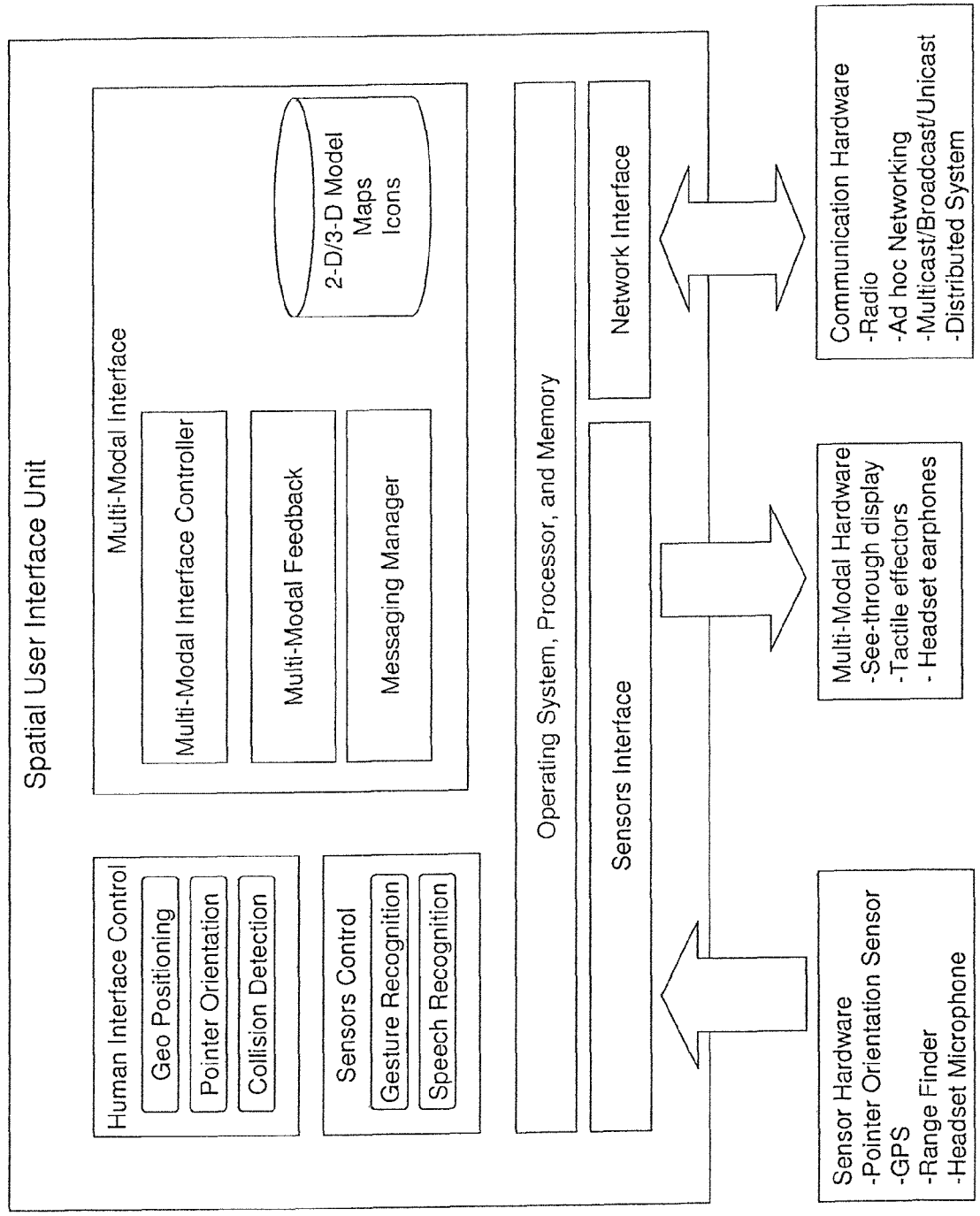
FIG. 1 is a block diagram of the multi-modal interface, and applications and agents associated therewith, that can be utilized in accordance with an embodiment of the present invention.

Embodiments of the systems of the present invention are generally depicted in FIG. 1, and comprise various hardware components and other input and output devices, as well as computer software and database components, which are designed to work together to facilitate the generation, transmission, processing, review, dissemination, receipt and view of multi-modal and geo-tempo-registered messages. As shown in this figure, a plurality of sensor input software and hardware, multi-modal output software and hardware, and communications software and hardware, interface with a centralized processing command unit; however, as hereinafter described, preferably the system of the present invention comprises a plurality of processing command units in a decentralized configuration.

Most generally, the systems of the present invention comprise a plurality of input, processing, and receiver/output devices. By this system, and using an application interface, the user generates a command or message via the input devices (an "event"); this command or message is interpreted by the processing software and compared to the related databases to determine whether it is a command for the same or another device, or a message for transmission to other users. The system then transmits control or messaging signals to the output devices to control the same, or to disseminate a message.

General System Components and Architecture.

The present system contemplates a series of input devices that generate electronic signals representing user speech, gestures, location, pointing direction, and in some embodiments range finders. Further input devices include, for purposes of system output, devices that generate electronic signals representing the user's look-vector. Associated with or integrated into many of these input devices are translation or recognition agents capable of converting raw electronic signals into meaningful data.

The system further comprises an application interface, a plurality of software agents and databases (and the hardware and physical engines associated therewith), and devices that generate and transmit signals to control objects or communicate messages. The agent based architecture in the system enables the system to be deployed in centralized and distributed computational platforms, and further enables flexibility and adaptation of the application in run-time to adjust to environmental, mission and other issues.

The architecture of the system of the present invention is designed to be flexible enough to be able to provide its communication and control services and operate under either or both a centralized and a distributed manner. This characteristic allows the person deploying the system to adapt it to her own needs and computational resources. Thereby, the system could deploy all of the services at one or more servers which perform the calculations associated with user requests/demands, and consummate related actions, in a centralized manner. Alternatively, each of the calculations may be performed on processing and memory resources local to the user (e.g., running all the system services on a wireless enabled handheld device). A third and preferred option is that the services are deployed at nodes, with each node having processing and memory resources to perform some calculations, and where any node may be a client/user as well as a server. In this distributed manner, dedicated server nodes are not required. In any of these designs, the system provides the application of its services in a completely transparent way, from the application's point of view.

Input Devices.

As described generally above, the present invention contemplates a series of input devices that generate electronic signals representing speech, gestures and pointing direction generated by a user, the location and look vector of the user, the distance from the user to an object. More specifically, audio and gesture input devices receive a user's speech or gestures, and initially convert the speech or gestures into electronic signals; location input devices determine and transmit the location of the user in coordinates (longitude, latitude, and altitude); one or more pointer input devices determine and transmit the direction of the pointer used by a user (azimuth, pitch and roll); and range finders determine and transmit the distance from a user to an object the user is pointing to. All of this information can be used by the present invention to control objects, transmit information, tag structures or locations, or generate a user's look vector (the user's view through goggles or glasses, determined from information from the location input device and a pointer input device).

Suitable speech input devices for use with the present invention include any commercial off the shelf (COTS) computer microphones, such as 3.5 mm stereo headsets, USB Microphones, and USB webcams including a microphone. Typical brands for these components are Dynex, Logitech, Belkin, Plantronics, and others. These microphones have means to receive and translate user speech into electronic signals representing the user utterance, but do not presently have integrated speech recognition software.

Suitable gesture recognition input devices for use with the present invention include pointer devices, such as the Air Mouse from Gyration and the Wii Remote from Nintendo. These input devices have means to receive and translate gestures into digital signals, and have integrated gesture recognition software. The core of these products includes three gyroscopes and three accelerometers to implement inertial navigation systems. With this combination of elements, the pointer devices are capable of transmitting the relative trajectory of the device held and/or worn by the user, and processing the trajectories to translate the gestures made by the user into pre-programmed messages corresponding to such gestures. Algorithms may be modified or implemented on the gesture recognition input device to process data from the gyroscopes and accelerometers along a timeline, including machine state and neural network algorithms.

Figure 5:
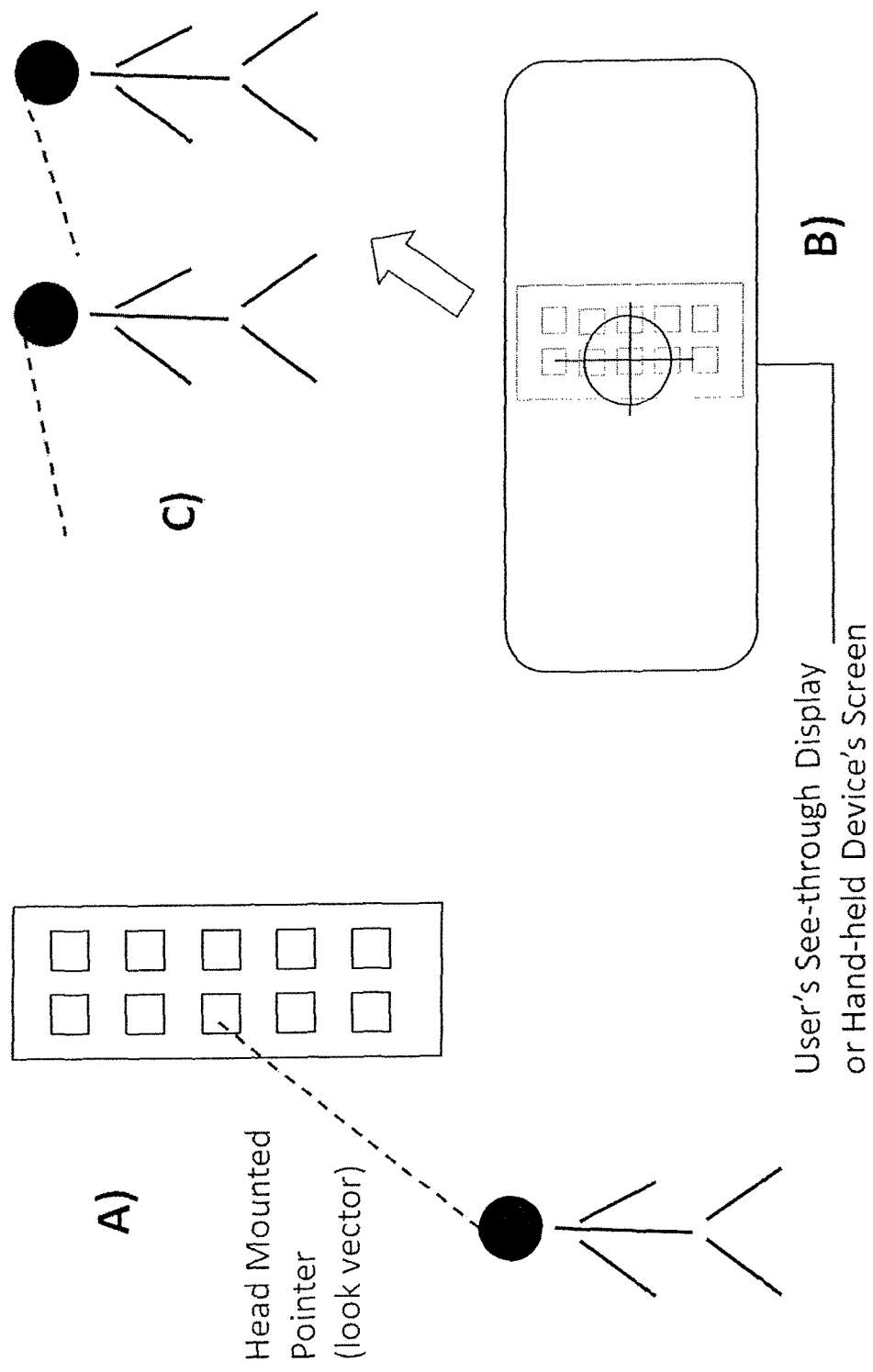
FIG. 5 are various pictures demonstrating various input and output devices used in association with the present invention, wherein picture A shows a user aiming to the surroundings, and commanding (by gesture or voice) the system to mark a location; picture B shows a user marking a point in the surroundings, thereby geo-registering the point; and picture C shows other users, using the same system, that will see the registered point when the point is within their field of view.
Figure 6A:
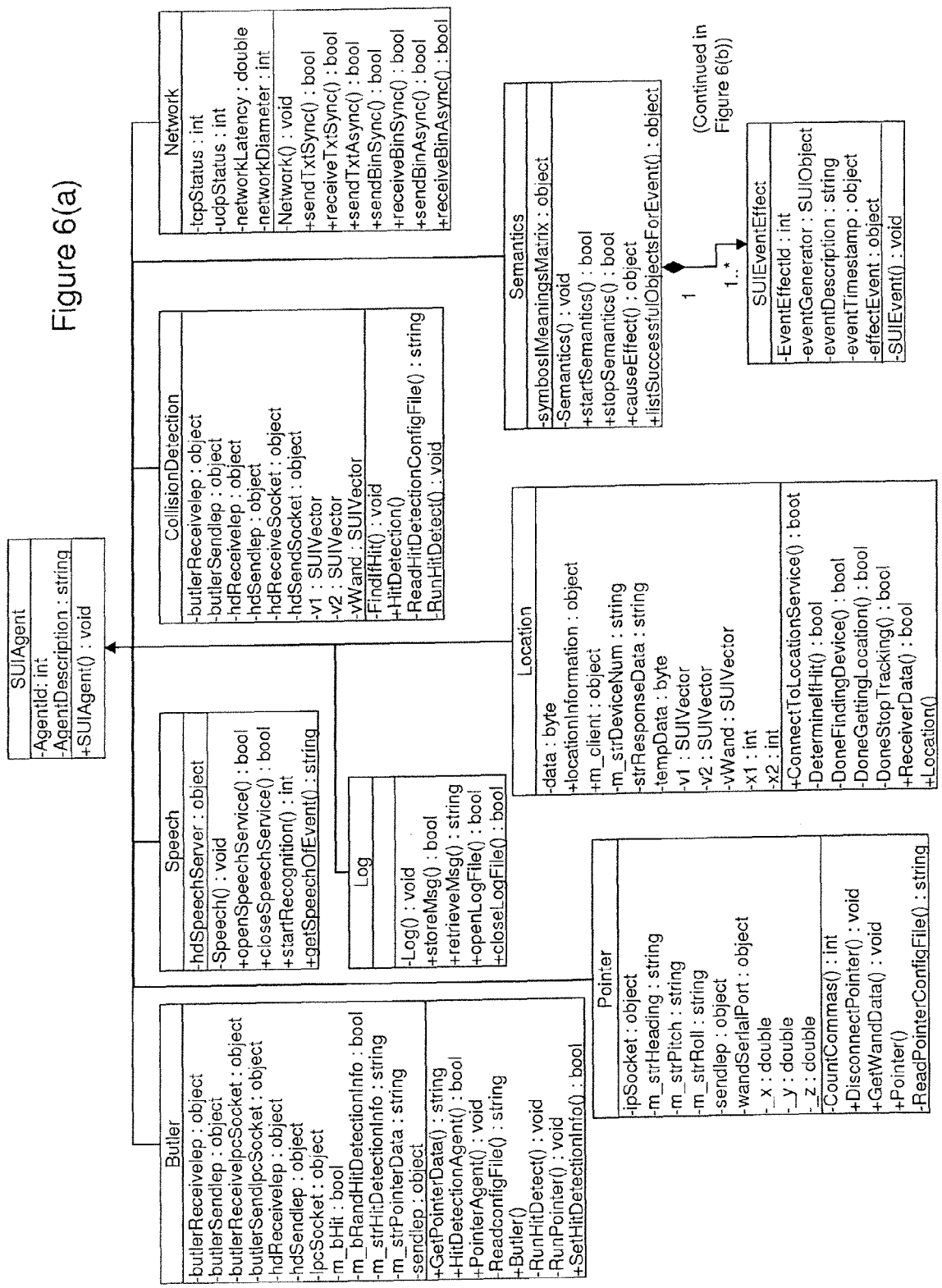

The pointing and gesturing input capabilities may be embodied in a single component, or may be separate components (e.g., pointing with the head while generating gestures with a device secured to or held by a user's hand). Pointer orientation sensors suitable for use in the present invention (for purposes of determining a user's intentional pointing direction and a user's look vector) include those based on electronic magnetic compasses (EMC) like Honeywell HMR3300 and HMR3000 digital, inertial movement units (IMU) based on gyroscopes and accelerometers like the one included within Honeywell Dead Reckoning Module DRM4000, among others. Specifically, EMC may be useful in contexts where no significant magnetic noise is present in the surroundings. IMU units are not only an alternative technology to EMC, but also a good complement candidate, given their resiliency to magnetic fields. FIG. 5 shows an EMC-based pointer, in both hand-held and helmet versions.

GPS devices, such as GlobalSat MR-350P USB/RS232, Garmin 18 USB, and Pharos IGPS-500, among many others can be used as input devices in association with the present invention to track the location of a user. These devices transmit the coordinates of a user to the processors of the present invention at pre-programmed intervals; further, they can be programmed to transmit the coordinates upon receipt of a request from the processors of the present invention. Thus, for example, the processors of the present invention may generate and transmit a digital signal to GPS input devices to obtain the coordinates of a transmitting user or a group of users upon receipt of any message or a particularly categorized message.

In some embodiments, a range-finder is also used to determine the location of geographical features or structures to be tagged. These are especially helpful where no 3-D model of the environmental surroundings is accessible to the processor. The range-finder will determine the distance from the user to a target, which will allow a general area of space (in which the target is located) to be tagged, as hereinafter described. Like the other input devices, this device is capable of generating a digital signal representing the range to an object, and transmitting the same to the processors of the present invention. Range finders suitable for use in the present invention include Opti-Logic RS400 Industrial Laser Rage Finder x/RS-232 Serial Port. This device requires simple calibration and gives range readings up to 400 yards with 1 yard precision.

Recognition Agents.

The input devices transmit electronic signals representing the information they are charged with collecting (voice, gestures, location, pointing direction and range to target) to the sensor interface of the present invention. Some of this information is translated into data by the software on the input device itself (for example, some of the gesture input devices hereinabove described, range finders, and pointing devices, transmit data rather than raw electronic signals). This data may be further translated into data meaningful to the system. Other input devices presently available in the marketplace only generate electronic signals representing the user input, and to be meaningful to the present invention must be translated into data for further processing by the present invention. Thus, one or more translation agents are preferably integrated into the system of the present invention. These agents may be located on any node, cluster or server within the system, including without limitation a light Personal Digital Assistant on the user.

Speech recognition software/agents are typically coupled with commercial speech input devices. These agents receive electronic signals representing user utterances from the speech input device, wherein the electronic signals from the input device are first transformed into digital signals by software drivers included in computer operating systems like Windows. The resulting digital signals are further processed and transformed into data by the speech recognition software of the agent, like Windows Speech Recognition (available at Windows Vista). Other suitable speech recognition software products include Microsoft Speech Server, AT&T Natural Voices, Conversay, and DECtalk. Services differ between manufacturers, and most of them do not offer either an application program interface (API) or a documented API for the integration of their solutions with the system of the present invention. However, the system of the present invention is independent (in the sense of being able to work with different underlying services) of the speech recognition technology used. Specifically, the system acts as an overlay service for the application level, which in turn uses the services of several underlying services or engines. Thus, the speech services (as well as the location services) are considered interchangeable services for the system, and the designer of the system may choose whatever the best technology is at a given time for a given application. In testing of the system interface-concept of the present invention, Microsoft Speech Server performed best given its superior quality signals. These products also provide text-to-speech capabilities and can be used for audibly communicating text messages in the system of the present invention.

Data from the other input devices may need to be translated into the language of the present system; thus additional translation or recognition agents may be incorporated into the system of the present invention.

Internal Space, Mapping and Collision Detection.

The internal space of the present invention provides an efficient and effective model to synchronize real world (physical surroundings) with augmented reality. Preferably the geographical internal space of the system of the present invention uses relative local coordinates (based upon relation to a point set south-east of any point to be mapped), rather than true location coordinates or the location technology that may be provided with any third party products (e.g.; Ekahau uses a local 3-D Cartesian coordinates system and GPS uses a global angular system). Furthermore, because the system is targeted to local contexts, the geographical internal space of the system is based upon the (false) assumption that the earth is round (discarding the effect on the calculations from the fact that the earth is fat around the equator, as a result of the centrifugal force it gets from spinning on its axis). Extensions regarding the earth's dimensions are not significant in the local context, and can therefore be ignored. Thus two points with the same altitude are modeled as being in a plane horizontal to the X-Y plane in a Euclidian space.

In determining whether two-dimensional, or three-dimensional, mapping is appropriate, the purposes for the system should be considered. In a traffic control application aimed to provide police officers the ability to control traffic lights depending on ongoing traffic conditions, 2-D mapping is sufficient. In this environment, the police officer points at a traffic light and gives a voice command through a speech and wireless enabled handheld device; these input signals are transmitted to the sensor interface of the present invention, which will process the information and transmit an appropriate signal to the traffic light, thereby allowing the officer to better manage real-time traffic conditions, due to an accident for example. However, for a theme park battlefield game application aimed to give the users a realistic feeling of what targets are shot when they pull the trigger of wireless- and speech-enabled weapons, a 3-D space would be preferable.

The latter example is similar to true battlefield maneuvers, and its demands for a realistic scenario dictate a 3-D space in order to enhance the performance, strategies, and skills of the users involved in such maneuvers.

The configuration file of the geographical internal space of the system contains information about of the space (3-D or 2-D, i.e.; Z=0), and true latitude, longitude and altitude coordinates (A, B, and C) of the point of origin. A point of origin is positioned at ground-level, south-east of the location, and thus all valid points in the system space will satisfy x>=0, y>=0, and z>=0 (where the x axis represents relative latitude, the y axis represents relative longitude, and the z axis represents relative altitude).

The file format for the system space of the present invention includes the following elements:
\# data describes objects represented in the internal space of the system
\# x,y,z define a box of dimensions x,y,z
dataformat GPS
origin x1,y1,z1 (set as the 0,0,0 in the internal space representation)
maxxcoordinate x2
maxycoordinate y2
maxzcoordinate z2 (for 2-D models this valued equals 0)
minzcoordinate z2 (for 2-D models this valued equals 0)
staticobjectsdatafile c:\o.txt (objects are modeled as polygons, which are a set of lines)

The system space data file includes the relative location of all passive (stationary, do not have the capacity to directly interact with other objects, do not generate events for the system) objects that can be controlled by means of the system, and all active objects (mobile, have the capacity to interact by means of the system with other objects) that transmit location information to the geographical space of the system. All of the objects mapped in the system are associated to one (and only one) input and/or output device; however, one device can be associated with one or more other devices (e.g., plurality of lights in a room, plurality of devices on a user). Every object has identification, location, and is modeled by the space it occupies (area in 2-D, volume in 3-D), and radius and height for a cylinder, or width/length and depth for a rectangle with a square area. Thus, in 3-D every stationary object comprises a set (one or more) of polygons, with each polygon represented by a set of points where the first and the last point are the same. In 2-D, the stationary objects may be represented by a single polygon, a sequence of points where the last and the first point are the same, a set of polygons, or simply by a sequence of points where the last point and the first point in the sequence are not the same.

Sample formats for objects in the space include:
GPS \# (or KML, or other)<
<a,b><c,d> . . . <k,1><ObjectID>, meaning multiple consecutive segments, or
<a,b><c,d> . . . <a,b><ObjectID>, meaning a close shape, a polygon All mobile objects, including users, whose locations are tracked in the space of the system deliver coordinates or other similar location information to the space processors for mapping, user look vector and/or collision detection.

Since the location coordinates transmitted to the system are provided in true coordinates, this information must be translated into system relative coordinates (x,y,z) by a location translation agent, using one of the following formulas. In these formulas, the true coordinates of the point of origin are A, B, C, where A and B represent latitude and longitude, respectively, in radians, and C represents altitude in meters. The true coordinates of the point of location transmitted to the system are D, E, F, where D and E represent latitude and longitude, respectively, in radians, and F represents altitude in meters.

Example Translation Formula 1:

The rectangular coordinates derived from the spherical coordinates for each point are:

Point of Origin: x=cos(A) cos(B)r; y=cos(A) sin(B)r; z=sin(A) r

Point of Location: x=cos(D) cos(E)r; y=cos(D) sin(E)r; z=sin(D)r

Thus, for any given (GPS) point, the corresponding point in the system space is:

$$x = r|\cos(D)\sin(E) - \cos(A)\sin(B)$$

$$y = r|\sin(D) - \sin(A)$$

$$z = F - C$$

where r(ω) is the radius at a given geodesic latitude ω, $$\varphi = \frac{(A+D)}{2}$$

$$r(\varphi) = \sqrt{\frac{(a^2\cos(\varphi))^2 + (b^2\sin(\varphi))^2}{(a\cos(\varphi))^2 + (b\sin(\varphi))^2}}$$

with a=the Equatorial radius=6,378.135 km and b=the Polar radius=6,356.750 km

Example Translation Formula 2:

In this example the length of the arc segments (assuming that these arcs are a straight line) between the respective points A, B, C and D, E, F, along the latitude and longitude, are the values for x and y in the system space, respectively. Using the formula for calculating the length of an arc segment, $$S = r*\theta$$

with r being the radius of the sphere (earth), and θ being the angle formed by the relevant points in the circle (latitude or longitude) at the center of the sphere, this approach gives us the following formulas for x and y in the space:

$$x = r(D-A)$$

$$y = r(E-B)$$

$$z = F - C$$

where r is the average of the equator and polar radii $$r = \frac{(6,378,00 + 6,356,000)}{2}$$

Thus, the internal model of the system space is mapped (loaded) with an initial layout (list of objects and locations) of the physical context to be modeled; this space may be maintained with the addition, removal, or update of objects.

Objects within the system may be organized in order to improve the searching process, especially for a system having a large number of passive objects. This structure has complexity $O(\log_m n)$, where m is the number of children per node in the space partition tree (hereinafter described), and n is the number of items in the space. If the objects are not organized, the collision searching algorithm is the naïve algorithm $\sim O(n)$. For the fastest search capability, the objects are organized into a search tree, with m=2. This feature of the system allows the system to improve its performance in searching collision detection, provided that passive objects are mainly stationary. As active objects in some embodiments carry their own processing units, each one of them may use its own processing power to resolve collisions with a remote pointer.

A location service/engine facilitates this mapping and tracking of objects of the system of the present invention. No specific location service/engine is preferred or necessary; any location service suitable for use with the application should suffice. However, an example of a suitable location service is the Ekahau environment, where movement paths are defined for Wi-Fi enabled users, and a 3-D representation of the model is built in the Ekahau environment using the Quake game engine. The location service runs preferably as one or more agents, at a lower layer than the application interface, as hereinafter described (which in turn runs at a lower layer than the application service layer).

With objects mapped, the system is able to support a user's "tagging" of a geographical feature, building or object, or a point in the system space (or determine each user's look vector). Much of this technology is facilitated by collision detection agents (where an event is tied to a specific structure or geographical feature pre-defined in the system space). For any of these to occur, the system must translate the location of the user (as hereinabove described), and receive the direction of a pointing device. If there is insufficient information or no pre-programmed map of the surroundings or geographical features/structures, then the system will also retrieve the range measurement from the range-finder to geo-reference a location in the system space.

When a user desires to "tag" certain geographical features and/or buildings in the user's environment, a "six degrees of freedom" (6DoF) vector associated with the user is determined by the geographic coordinates of the user and the orientation of the pointer worn/carried by the user (and, if relevant, the relative location of the pointer on the user, for example her wrist, finger, head, or shoulder). Thus, the geographic coordinates of the user (latitude, longitude and altitude) are received from the GPS input device and translated into the system's relative space, and the orientation of the pointer (azimuth, pitch and roll) are generated and transmitted by the pointer input device. The pointing by the user can be tracked over time, so that for example an entire building may be outlined, or the perimeter of an area defined. The relative location of the pointer in relation to the GPS device may be input by the user prior to beginning the mission, may be pre-programmed into the system with the identification of the object, or may be programmed on the pointer device for transmission to the processor of the systems, based upon the intended location thereof (e.g., if it is designed to be worn on a helmet, the device will be pre-programmed to transmit a marker to the processing software that it is located on the head of the user). Knowing where the user is pointing from (by GPS and pointer device information) and pointing to (by orientation of the pointer, and in some cases using information from a range finder), the processor is able to determine the 6DoF vector. Using the collision detection services as hereinafter described, the user may precisely reference an object in the system space (e.g.; a window on the second floor of a building, an object at ground level, etc.)

Each user, and some active objects of the present invention, are mapped as a vector in the space of the present invention; these vectors are used to facilitate/standardize the calculations made by services like the collision detection service.

Collision detection in the present system are based upon, and extended or customized from, one of the several engines developed within the gaming development community. The general process for collision detection is to locate a vector in the space (in the present system, the 6DoF Vector), projecting a ray through it, and determining which objects (polygons) are intersected by the ray. However, searching for the objects intersected by a ray in a large scale system is problematic, even using improved algorithms. Therefore, in order to reduce the impact of a large number of objects on a modeling effort, the searching process may be supported by a Binary Space Partition (BSP) Tree. BSP is a tool widely used in the game industry to structure the space in a manner which improves the performance of rending and collision detection functions (O(log(n))), and is therefore incorporated into the processors of the present invention for large scale systems (although BSP may be avoided in low scale settings, where a linear search (O(n)) may accomplish appropriate performance). Using BSP, the main functions of the collision detection agent of the present invention are described as:

```
String CollisionsFor(Point p, Vector v) {
// evaluates if ray v at p collides with any of the objects under the scope of
this device
// this is a recursive algorithm that navigates the BSP tree searching for all
the objects intersecting the ray; generates and returns a list of objects
intersecting the ray.
}
Int16 CreateBSPTree( ) {
// based on the information given in the config file, each system node will
create the same BSP having as leaf nodes the objects under its scope
// Such design allows flexible configurations for considering passive
objects, i.e.; all the objects are under the scope of a single device (server),
or the objects are grouped in clusters (1+ objects) which are under the
scope of different devices (servers).
}
Int16 BalanceBSPTree( ) {
// Used to improve the performance of ray tracing operations.
}
```

The algorithm to split the region into two sub-regions (box into sub-boxes) selects the larger side of the box and divides through that side. At least from a qualitative perspective, by using this criterion, the size of the smallest boxes, the ones that actually contain the polygons, will tend to be homogeneous in their dimensions, thereby obtaining a more balanced collision process (response times).

An algorithm for 3-D collision detection developed under this work follows:

```
// First determine the plane of the polygon, and the intersection of the ray
with such polygon by solving (A/D)x + (B/D)y + (C/D)z = −1
//       A = y1(z2−z3) + y2(z3−z1) + y3(z1−z2)
//       B = z1(x2−x3) + z2(x3−x1) + z3(x1−x2)
//       C = x1(y2−y3) + x2(y3−y1) + x3(y1−y2)
//       D = −x1(y2*z3 − y3*z2) − x2(y3*z1 − y1*z3) − x3(y1*z2 −
         y2*z1)
//           R(t) = R0 + (R1−R0)t ; R(t) = v.ini + (v.fin − v.ini)*t
//           A(x0 + xd*t) + B(y0 + yd*t) + (z0 + zd*t) + D = 0
//           t = −(A*x0 + B*y0 + C*z0 + D) / (A*xd + B*yd + C*zd)
//       Then R(t) = (x0 + xd*t, y0 + yd*t, z0 + zd*t); which is the
intersection between the ray and the polygon's plane
// Determine if is this point is inside the polygon or not
Using a vector orthogonal to n−c which will be used as direction to
evaluate if the intersecton pint is inside or outside the polygon.
Nnormalize direction vector
//               r = a + l*(b−a); 0 =< l <= 1, is the equation for the
                 segment of the polygon
//               rx = c.x + l*(n.x − c.x);
//               ry = c.y + l*(n.y − c.y);
//               rz = c.z + l*(n.z − c.z);
//               r = v + ts, where t >= 0, v = origin of ray vector, and s
is the direction (any in the plane where the polygon is embedded)
//               So, the coordinates of an intersection point must satisfy:
//               c.x + l*(n.x − c.x) = Xp + tt*o.x;
//               c.y + l*(n.y − c.y) = Yp + tt*o.y;
//               c.z + l*(n.z − c.z) = Zp + tt*o.z; // 3 equations, 2
                 variables: 'l' and 'tt'
// Count the number of sides intersected; if odd the point is inside, if even
it's outside (Jordan Curve theorem)
```

In 2-D collision detection (wherein the calculations are already in the planes of the polygon), the only condition to determine a collision is if the ray/vector intersects at least one of the segments of the polygon or sequence of points. If so, the collision detection engine returns the Id of the object(s) intersected by the ray.

```
Set IndexToZero( );
c = this.GetNextPolygonPoint( );
n = this.GetNextPolygonPoint( );
o.x = v.end.x − v.ini.x; o.y = v.end.y − v.ini.y; o.z = v.end.z − v.ini.z;
// vector orthogonal to n−c which will, be used as direction to evaluate if
intersection point is inside or outside the polygon
den = Math.Sqrt(Math.Pow(o.x, 2)+Math.Pow(o.y,2) + Math.Pow(o.z,2));
o.x = (o.x/den); o.y=(o.y/den); o.z=(o.z/den); // normalize direction vector
while (n != null) {
//   r = a + l*(b−a); 0 =< l <= 1, is the equation for the segment of the
     polygon
//   rx = c.x + l*(n.x − c.x);
//   ry = c.y + l*(n.y − c.y);
//   rz = c.z + l*(n.z − c.z);
//   r = v + t*o, where t >= 0, v = origin of ray vector, and o is the
     direction
//   So, the coordinates of an intersection point must satisfy:
//   c.x + l*(n.x − c.x) = v.ini.x + tt*o.x;
//   c.y + l*(n.y − c.y) = v.ini.y + tt*o.y;
//   c.z + l*(n.z − c.z) = v.ini.z + tt*o.z; // 3 equations, 2 variables: 'l' and
     tt
l = (o.y * (c.x − v.ini.x) − o.x * (c.y − v.ini.y)) / (o.x * (n.y − c.y) − o.y
* (n.x − c.x));
t = (c.x + l * (n.x − c.x) − v.ini.x) / o.x;
if ((l >= 0) && (l <= 1) && (t >= 0))
{ // a collision has ocured
return objectID;
}
c = n;
n = this.GetNextPolygonPoint( );
}
```

In order for a functional game to be complete, a physics engine able to determine semantics for the intersection of two objects must be used. Quake 2, Quake 3, Doom III (well-suited for indoor environments, but comparatively poor for large, outdoor spaces), and Far Cry are engines suitable for use in embodiments of the present invention.

Finally, to allow information to be overlayed on a user's visual screen, a user look vector is generated by information from an EMC, an IMU, or a group of them on the user, positioned in relation to the user's glasses/goggles, and transmitted to the processors of the present invention, with the latitude, longitude and altitude of the user received from the GPS device. This vector, like the user pointing vector hereinabove described, aggregates information regarding the azimuth, pitch, and roll of the user's head and the latitude, longitude, and altitude coordinates of the user. With this information, the algorithms of the present invention are able to determine the field of view of the user, and overlay information onto the viewing screen regarding tagged features, structures or areas, or geo specific information. The user's field of view is modeled as a rectangle aligned with the user's azimuth axis. Horizontal and vertical angles/scopes are pre-defined based upon the visual screen device configuration so that the range of analysis (also pre-defined by the system) will provide geo-tempo-registered marks in the surrounding environment. Once the geo-location of a tagged structure, location or icon is retrieved from the system for display on the visual screen, it is mapped to the user view using traditional 3 D to 2 D transformation/scaling algorithms. Furthermore, when critical tagged information is not in the field of view of the user (but is in the range of analysis), information may still be transmitted to the viewing screen by an icon and/or text, or other similar information.

MultiModal Interface and Database/Physical Engine.

With the various input devices, translation/recognition agents, and mapping and collision agents as hereinabove described, the system of the present invention further comprises a multimodal application interface, a matrix database and a physical engine that receives and compares the input, and generates signals to cause objects associated with the system of the present invention to act as requested by users, through their voice and gesture commands (as programmed into the matrix database). As with the agents, each of these components may be centrally located, or more preferably distributed among a plurality of system nodes, including any computer device on the user.

The multimodal interface allows total flexibility for the developer and the final user to manipulate the natural actions to interact (voice and gestures), and enables an adaptable and customizable interface between a) the user and the system during the input process, and b) the system and the user during the output process. This interface comprises a sensor input interface, which is programmed to detect and recognize (or disregard) voice and/or movement patterns of the audio and gesture input devices (after processing by the translation/recognition agents associated therewith, as hereinabove described). Other input information that is received at the sensor interface and transmitted to the system map and, in some instances, the collision detection agent, are pointer coordinates, user look vectors, and user location coordinates. This information is frequently tagged to gesture and voice input commands and data, and mapped features and messages, so that the commands and messages become location specific either in transmission, action or storage.

Generally, each multi-modal interface is in idle mode until it receives and detects a valid input from an input device, in which case it enters a triggering events mode. For this process to occur, a hardware status/alert controller is permanently monitoring the data gathered from the sensors. The controller is coupled with an N×1 syntax-semantics matrix database, which suffices to implement this feature. This database comprises rows corresponding to syntactical elements (i.e., symbolic representation [strings] for utterances and the pointer's movement patters, or any combination thereof), while columns correspond to the semantics (business logics, command, etc) assigned for the syntactical element. Thereby, the sensor interface is able to detect when a voice or gesture input corresponds to a message or command for the system, for further processing.

Once the sensor interface receives and recognizes a voice or gesture message/command, the same is compared to a distributed or centralized database of the present invention. This database comprises an application-specific language matrix, defining the relationship between symbols (input commands) and meanings (output commands), which controls and allows the customization of the present invention. Thereby, the system of the present invention is applicable in a variety of contexts (e.g., theme parks, battlefield situations and simulations, transportation settings, and social networking), allowing variations between the objects/commands and their meanings as appropriate for any particular application.

The input commands defined in the matrix include all possible objects designed and configured to send signals to the sensor interface (including the users, preferably defined as a distinct category of objects). Thereby, all objects are distinguished in the database, as well as the commands applicable to those objects. In most embodiments, speech detected by the audio input device, and movement patterns of the gesture input device, are the primary input commands received by the sensor interface. Thus, the language matrix is typically defined as an m*n*l language matrix, with m=the number of speech patterns the system is able to deal with (plus the null element meaning no speech pattern), n=the number of pointer/gesture movement patterns the system is able to deal with (plus the null element meaning no speech pattern), and l=the number of meanings (effects/consequences) for the system. Each cell of the language matrix may hold either a 0 or a 1, signaling that if a cell (i,j,k), also referred to as a tuple, holds a 1, such combination of causes-effect is a valid tuple for the system, otherwise it is an invalid tuple and the system treats it a "no meaning" situation sending a corresponding message back to the application. This database may be located at a central command center for the system, or distributed among several nodes (including even a partial database at certain nodes, the data thereof being the data necessary to process commands of a certain type, or from a particular input object).

Once an utterance or gesture message is detected and recognized by the voice and/or movement pattern (time and space pattern) (an "event") at the sensor input interface, the same is transmitted to and classified by the language matrix database, using a physical engine. Incorporating modeling elements commonly used in the linguistics community creates a more robust, reliable and flexible syntaxes-to-semantics transformation, which in turn makes the interface more natural and intuitive for the end user. Thereby, the physical engine and database operate as an object control of the system, processing gesture and voice information received from the input devices (or the recognition agents associated therewith), and translating the same into system operational commands or transmission messages based upon the correspondence between the input and a pre-defined command, all as set forth in the database.

For instance, if a user in a simulated battlefield pulls the trigger of his/her rifle, the command/event in that case is the action of pulling the trigger. The system of the present invention translates this input into one or more meanings defined in the database matrix. The meanings may be a command to obtain additional information from other input devices. Thus, when the user pulls the trigger and if additional information regarding the impact of the "shot" is desired, the system of the present invention will seek the direction of the rifle (using the location and pointing input and 6DoF vector, as hereinabove described). This directional (and location) input is transmitted to the collision detection agent described above, so that the system will determine whether it is feasible that an object would likely be hit by the projectile from the rifle. Depending on where the object is hit (as determined by the collision agent), the system of the present invention by means of a database would decide whether the object is "killed", "injured", or "destroyed", for example (although various outputs could be programmed into the database matrix of the present invention). As one might expect, if the user shot a grenade, the meaning of the shot may be categorized completely differently than a rifle shot.

As discussed above, in some embodiments, the database may comprise a plurality of databases, wherein certain preliminary or basic functions may be performed based upon user input without comparison to the primary database. These secondary databases and associated physical engines may be located on a user, or at other distributed nodes of the system. A particular secondary database would be the N×1 database associated with the sensor input interface. When databases are distributed in this configuration, the secondary databases (and their associated physical engines) may work to gather information, as necessary, to transmit the same to a principal database or to independently take action based upon the command received.

The physics associated with determining the effect of various user actions is provided by a physics service (algorithms describing user/object properties, their interactions, and consequences of such interactions) incorporated with the present invention. The Physics Service may model, for example, radial explosions and detection of the objects affected by it. This service can be extended and customized to support the mechanics and dynamics of specific application domains, based upon physics services available in the gaming and simulations world and a customizable cause-effect service, along with the 3-D mapping and modeling made through the systems of the Present invention. Thus, with this physics service, the system is able to mediate the interactions of mobile users in varied domains. In addition, the systems of the present invention provide a mechanism for the application developers to define cause-effect relationships so they can make the system aware of such cause-effect relationships during runtime.

This matrical representation to process the inputs perceived by the sensor inputs of the present invention allows the system to be easily extended for other uses. This matrical representation is useful in modeling dynamic relationships between inputs and outputs, i.e., between symbols and meanings, which is a useful modeling feature for the development of consensus in populations of artificial users.

The implementation guidelines for the matrical representation include:
 a) Assigning an integer number>=1 to each possible symbol (speech) at $S_a$, so that a given symbol has one and only one integer number assigned, and each number used is assigned to only one symbol.
 b) Assigning integer numbers to each item (gestures) in $S_b$ following the same process outlined for $S_a$.
 c) Assigning an integer number>=1 to each possible meaning in M.

For example, the tuple (2,0,4) means that if the speech pattern detected is the one corresponding to number 2, e.g., "turn off the light", and no pattern is detected or required from the pointer, the meaning will be meaning number 4, e.g., "command the central light control to turn off the light switch at the room where the user is". Analogously a tuple (2,3,7) means that if speech command number 2 and pointer's movement command number 3 are detected, then meaning effect number 7 is carried out. On the other hand, if a NO MEANING tuple like (2,4,0) is detected by the systems of the present invention, it will generate a corresponding "no meaning" back to the application.

By means of the matrical representation, where each tuple (a,b,m) represents a cause-effect relationship, the system's physical engine can easily resolve the appropriate action of the system given a pre-defined input detected by it. The main purpose of this representation is to give enough functionality to the system's physical engine to articulate the information, without necessarily being aware of the particular context of applicability. Thereby, the system as a whole is designed to be flexible enough to perform in a variety of contexts (language matrix), where the semantics for a particular context is define by the application itself, and not by the systems of the present invention.

As hereinabove described, input data includes commands for input devices, commands for object control, messages for transmission to other users and user look vectors for receipt of messages or information. Once a command for an input device is detected after comparison to a database, the physical engine generates an electronic signal representing the command corresponding to the input data in the database, and transmits the same to the appropriate input device for receipt and action by the input device. Similarly, upon any command for object control, once identified in a database, the physical engine generates an electronic signal representing the command and transmits the same to the specified object (in some cases determined by the 6DoF vector of the pointing device, using the collision detection agent) to control the same at its control location. Finally, if the input comprises a part of a message for transmission to other users, as determined by comparison to a database, the database/physical engine (alone or in combination with other databases) gathers the remaining information for the message, and transmits the message (including modifications thereto, in the form prescribed by the user or the database, as hereinafter discussed) to other users.

Thus, for example, the microphone may capture a voice command indicating that a gesture command is about to begin; upon receipt, translation and recognition of this voice command, the physical engine (using an associated secondary database) would determine that the voice command indicates that a gesture command is about to commence, and may send a signal to the gesture input device related software agent to cause the gesture input agent to review signals generated by the input device and determine whether a gesture command is being generated by the user. Similarly, a voice command may be used to designate the end of the gesture command, which may, after comparison to the secondary database, determine that the gesture is complete and available either for on-board translation and processing, or transmit the same to another node of the system for processing. If the input data is not a command for other objects of the system, but rather information to be processed by the principal or another secondary database/physical engine, then the same is transmitted to that database.

Some of the input components may generate periodic signals and transmit the same to the mapped space, or generate and transmit signals at the request of a physical engine/database, without input from the user. For example, the GPS sensor may transmit a periodic signal regarding the coordinates of users for mapping within the space of the present invention, or for processing by an agent of the present invention designed to track movements and actions of the users to determine whether global user movements/actions might designate a retreat or indicate a threat, or determine that a battle is occurring, or otherwise, that could be represented by a message of the present invention (alternatively, the GPS input device may generate these signals periodically and transmit them to the sensor interface). When pre-programmed situations are detected by the system of the present invention, output signals or messages may be modified in mode, or new messages may be automatically transmitted to users, based upon the situation detected by the user movement agent, and the pre-programmed response within the primary database or a secondary database of the system (if a secondary database, this database may be designed and limited to determining user movements and adjusting and/or transmitting system messaging based upon certain movement patterns). In such an embodiment, for example, messages that would normally be transmitted as retrievable voice message may be transmitted by a tactile sensation, a computer-generated voice command, or otherwise, to minimize visual interruption, allowing the user to continue monitoring his immediate surroundings. In other embodiments this battlefield assessment may occur when the sensor interface receives and recognizes a message or control input command (a triggering event, or a "cue"), whereby the database matrix causes a local, remote or centralized physical engine to send electronic signals seeking information from the generating user and/or other users or objects, to know if the scenario is routine or high threat, for example.

The database/physical engine preferably returns some messages or commands to the creating/demanding user for confirmation prior to dissemination to other users or to control objects in the environment. This confirmation is helpful especially when geographical features or structures are being tagged, to ensure that there is not an error in the collision model, in the objects mapped in the system, or a miscalibration in the input devices. If there is an error, the user may re-input or otherwise adjust the location he had intended to tag before sending the message to other users. Confirmation (or rejection) may be by voice, gestures or other input device, which is received, translated, and compared to the database(s) of the present invention for action. Thus, the output-interface and associated physical engines prepare and distribute commands and messages to be provided back to the user, to object control processors, and to some or all of the team members, thereby allowing a user to control objects in his environment, correct his input (task/mission/plan), describe the result of his command, and/or share awareness/communication with the selected subset (or all) of the team members. This feedback mechanism allows users to control and correct the effectiveness of the communication process. This mechanism further enables the implementation of learning algorithms within the system to adapt to unique user gestures or accents.

Some or all of the messages or commands created by users (voice, gesture or pointing) may be marked on a corresponding time scale, with the geographical coordinates of the user. This information may be transmitted with the message to other databases/physical engines, to the recipients, and/or stored in a repository database.

Furthermore, messages may be combined for transmission by the systems of the present invention. Thus, voice, text, color, icons, visual, tagged or tactile messages may be associated or linked with one-another, or with a tagged structure, formation or location. These combinations are typically preset in the database(s); however, the language matrix of the database may be designed to allow a user to override these defaults prior to or during a mission. Furthermore, the processes may be designed so that the defaults change based upon detected environmental conditions, importance of the information and mission, and other factors that can be programmed into the databases prior to consummation of the mission, or based upon information received from some sensor inputs of the present invention during the mission. In some embodiments users of the system may pre-set their own preferences regarding the delivery, announcement and mode of messages they send and/or receive.

The matrix of the user movement agent, and/or the primary database, or any other agent of the system generating messages for other users, may be pre-programmed to determine the scope of dissemination of messages transmitted through the system—in other words, what users should receive the information based upon the situation, the role of the participants, and the appropriate geographic scope of the message. Further considerations regarding the scope of dissemination of the information can include the location where the information is generated, the level of impact of the information (for example, strategic, tactical, operational or close friends, acquaintances, general public), and the priority/threat/need level of the information. The determination of scope of messaging is preferably pre-programmed into one or more agents or databases of the system, and may comprise its own filtering agent/database. Subject to override, one or more databases of the system will further determine the redundancy (in some cases dependent on the activities/situation in which the receptors of the information are involved); and the timing and persistence related to the data, so that information is delivered quickly, but does not persist (remain associated with a geo-registered location) beyond an applicable period of time.

General System Architecture.

To provide system services in a transparent and flexible manner, the system borrows the concept of shared space found in distributed shared memory systems (Tanenbaum, 1995). The idea behind distributed shared memory systems is to provide every node participating in such distributed system the illusion of using a global memory, while such memory is really the collection of the contributions made by each node. The present invention builds on this concept, distinctly providing a single system application programming interface, receiving application requests by users for system services, and transmitting the same to objects (agents) responsible for locating and invoking, locally or remotely, the requested service.

Figure 2:
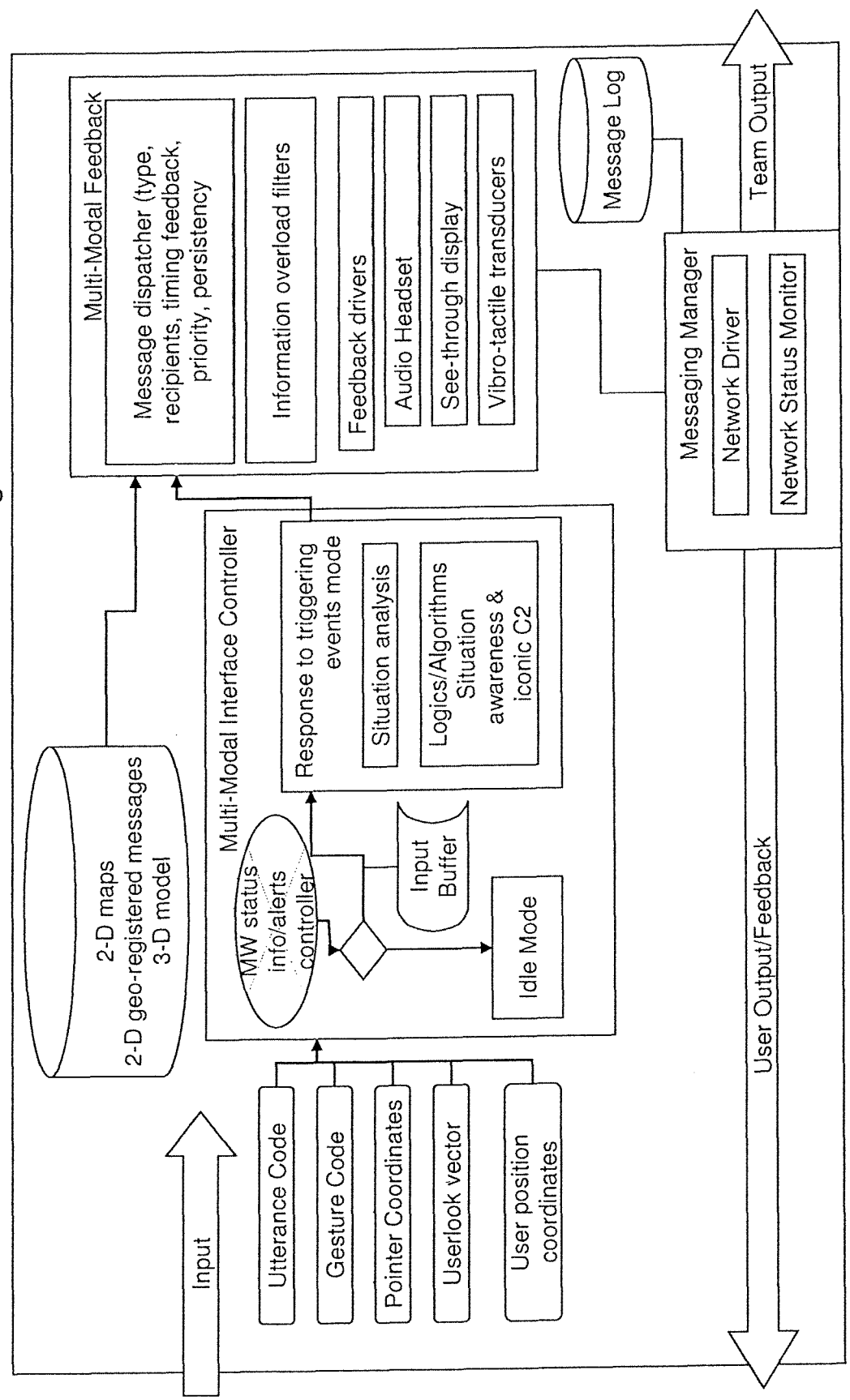
FIG. 2 is a more detailed block diagram of the interface, applications and agents shown in FIG. 1.
Figure 3:
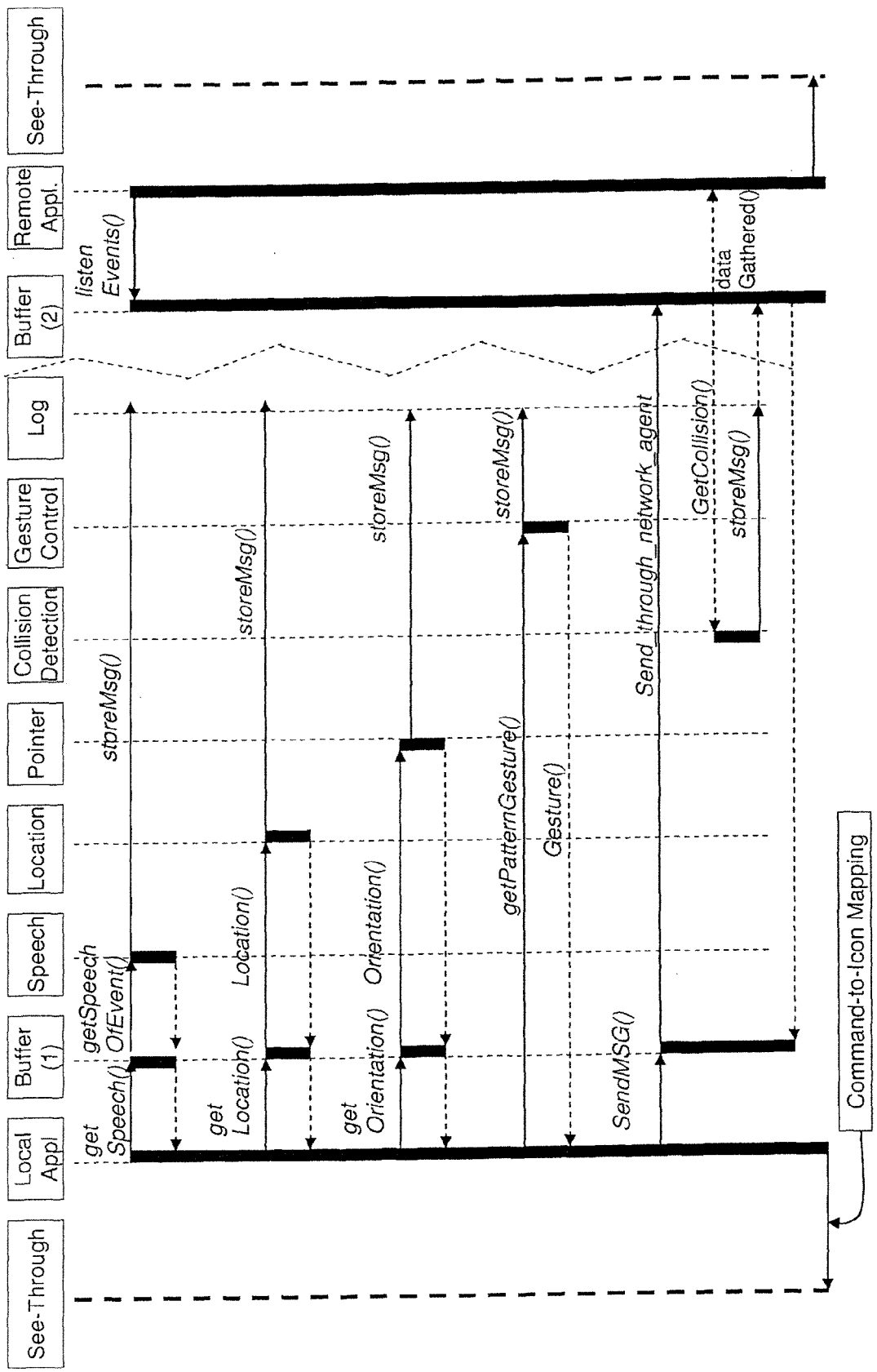
FIG. 3 is a UML sequence diagram of interaction by means of the present invention.

In most embodiments, the system architecture is an agent-based system. In particular, the functionality encapsulated in every lower level box presented in FIGS. 1 and 2 is implemented by a software agent, as shown in FIG. 3. An agent-based approach allows full modularity and functionality. Each service—speech recognition, location, orientation, etc.—is managed by an agent. Because agents run independently of the application, they can provide services to several applications simultaneously, if required. Furthermore, as application-independent units, agents may be designed and configured to detect environmental conditions which could affect the dynamics of the applications, such as a monitoring capability about network reliability to decide which connection-oriented or connectionless message delivery services can be best facilitated by the agents. This, thereby, enables self-configuration of the systems of the present invention. In addition, agents are conceptually hardware independent, so they may reside on servers, desktop PCs, or handheld devices. Thus, the agent-based architecture allows the system to be deployed in a centralized, distributed, or preferably mixed computational platform.

The interaction among the major components of the system of the present invention can be described through the example shown in FIG. 2, which is a broad introduction to the sequence of actions triggered after an event has been detected by the system interface. In general terms, there are two kinds of events: 1) the user produces an utterance, and/or 2) the user or the object generates a movement of the pointer device. Thus, a natural interface exploiting verbal and gestural communications is created ad-hoc for environments where users cannot spend time writing text messages. command to generate an event may be composed of only a verbal instruction, only a movement of the pointer, or both, depending only on the relationship defined between such inputs into the system and the meanings those inputs could have. For example, if a user says "turn off the light" in a room that the application is aware (because the system/database has been informed) that there is only one light switch, the system will not inquire or determine where the pointer is pointing. On the other hand, if the user says "Turn off that light", and this utterance is produced by an user located in a room with several light switches, then the system (under instructions from the databases) will inquire and determine the direction of the pointer, and using the collision detection agent as hereinabove described, will determine what object the user is pointing at, and will proceed with generating the requested effect on the intended object (by transmission of a digital signal representing the spoken command to the processing control center for such subject).

One or more "butler" software agents coordinate and mediate the interaction between the services and the other agents, transmitting information and commands to and among the input interface, various agents of the system, and the output interface. For example, function calls made from/at the application interface and/or a database may be mapped to the actual local and/or remote agents providing the services associated with such function calls (e.g., location, orientation, logging, etc.). Thereby, the location of the agents/services (local or remote) is totally transparent to the application. The butler may receive one message with one or a list of candidate intersecting objects, or several messages with one or several objects in each message. The butler will tie these messages together and send them back (bundled) to the system application-interface. A plurality of butlers may be implemented into the design of the system of the present invention. When a butler agent is an independent agent (always local to the application), it allows the butler to deal with information relevant to the independent application, such as, for example, monitoring network reliability during some period of time before the application is launched, so that the butler may determine whether it is better for the agents, objects and systems of the present invention to communicate in a connection-oriented manner, or using connectionless communication protocols (TCP vs UDP). This design is preferred over butlers designed as libraries loaded with the application, although the latter is a simpler programming endeavor. Either design is transparent to the system as a whole.

A memory channel can be used for communication between the butler and other agents running on the same device; for remote agents, sockets may be used. Preferably, this adaptation is made automatically by the butler agent. When the butler or agents are located on PDAs (Windows Mobile 2003 and above), OpenNETCF Application Blocks are used to communicate processes (applications) through memory, in the case of PCs, P/Invoke (calls to c++ memory mapped files functionality) is used to communicate between butlers and agents.

Output Devices.

As hereinabove described, the databases of the present invention include meanings for each input gesture or auditory command, or combination thereof. The physical engine associated with the database then transmits commands, through the sensors control, to the output devices used in association with the present invention to cause the device to take action, in accordance with the meaning in the database. Output devices include auditory listening devices (hereinabove described with headset microphones), visual/viewing screens, and tactile devices.

Auditory outputs may include a message from another user either directly transmitted to users or made available upon prompting from a user, or a computer generated auditory message (pre-stored sounds, verbal descriptions and speech generated from text) based upon directions from a user or the detection by agents of the system of general environmental conditions, such as an urgent retreat from an area detected by the agents of the present invention).

Visual outputs sent to a user viewing screen include visual icons, that may indicate a message or other information is available, or transmit a message (such as danger) by text or symbol. Visual outputs also include maps that may show the location of other team members (determined by GPS coordinates input into the system, and mapped to the space of the system), and tagged geographical features. Visual outputs available to a user are typically based upon their user-look vector determined as hereinabove described, using a 6DoF vector. Thus, inputs from the input devices gathering such information may define the visual output of the system to a particular user.

Figure 4:
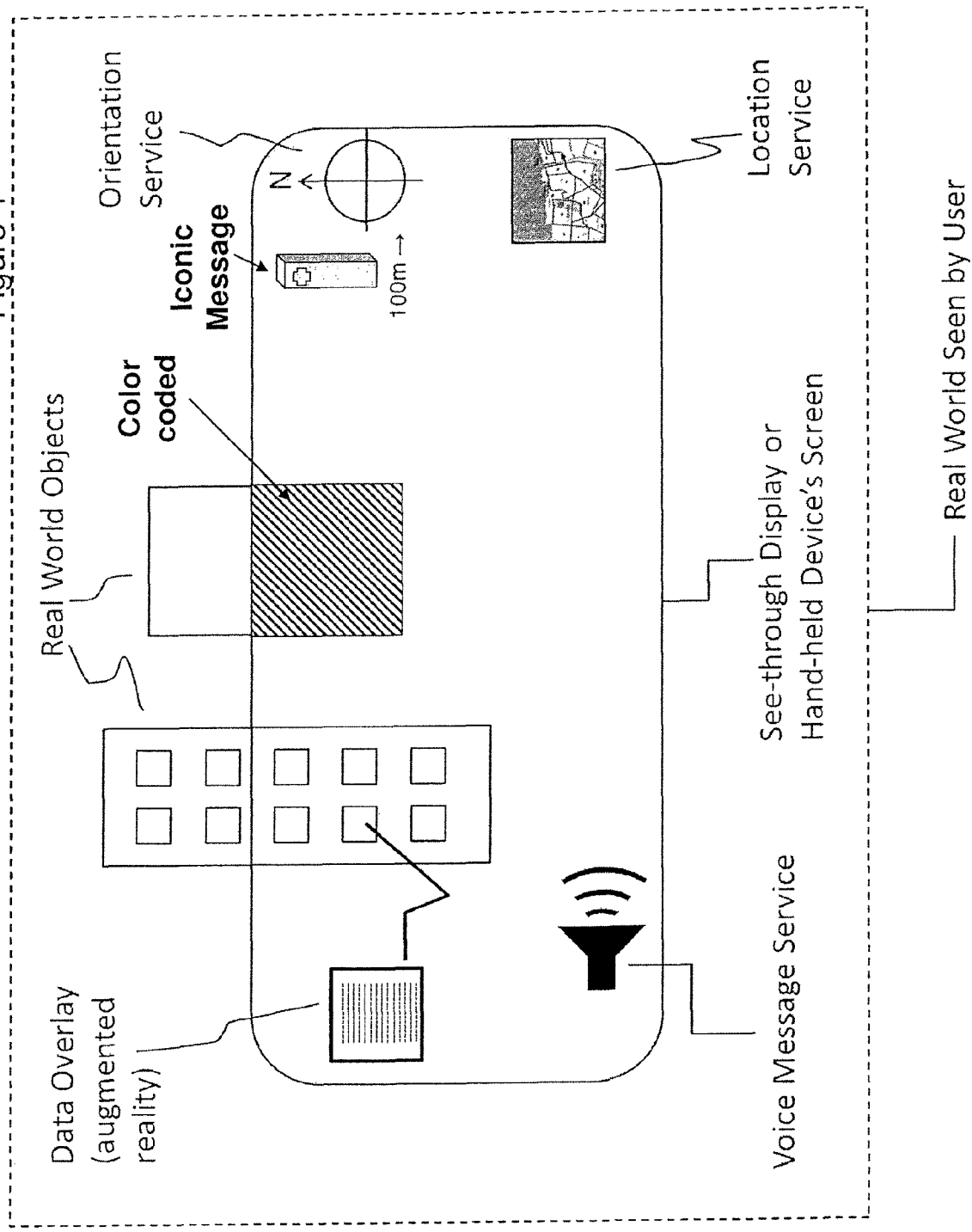
FIG. 4 is an illustration of an exemplary goggle view from a user's perspective, including information and messaging generated and transmitted to the user's view in accordance with the systems of the present invention.

As noted previously, the systems of the present invention support mobile users conducting activities in dynamic environments within a geographical region, such as battlefields and first response operations and everyday life social networking. A manner in which the system does this is illustrated in FIGS. 4 and 5. FIG. 4 shows a first responder's view on how geo-tempo-registered messages could be represented as a layer on the see-through display. This display is synchronized with the observed real world. See-through visual displays able to exhibit such capability are currently available or under development (such as wearable displays from microvision.com and bae.com). In this display, several buildings are marked by a transmitting user as potentially dangerous, one of which has a voice message associated with it; another having a text message. Furthermore, a map message is incorporated into the top of the view. An iconic message is also incorporated, showing that there is a structure a defined distance to the right of the field of view of the user, which structure has a message appended to it. Once this latter structure is in the field of view of the user, the structure will be marked, and the message will be displayed.

Tactile devices used for feedback include commercial off-the-shelf (COTS) capability like vibration included in cell-phone technology, and technology primarily developed for hearing and visually impaired persons, like skin vibration devices which transform sound waves into vibrations that can be felt by the skin. These capabilities may be incorporated into one of the other components of the present invention (such as any hand-held pointing device or a PDA) or may be an independent component.

A user's output components may be controlled by the user during operation of the system; for example, the darkness of the screen may be changed based upon user command, or upon other input information from additional input objects (e.g., light sensors) located on a user or otherwise, indicating the light in the environment of a user or generally of all users at a particular time.

Other components of the user's output may further be controlled and customized by the user, pre-mission or during a mission, by sending control signals to the sensors input of the present invention. For example, if a user desires that all auditory messages play immediately, regardless of the situation, and not be otherwise retrievable, the same may be programmed by the user into the database by a series of commands (wherein the database is programmed to activate such a preference upon receipt of such commands). Thereby, once the message reaches a team member, by direct on-line communication, or because the geographical location of the message is within or near their field of view, the multi-modal module will set the message delivery mode or content in whatever form the user's preferences (or the system's override) dictates.

By the foregoing, the sensors interface of the present invention receives messages from the sensor hardware, and transmits processed information to multi-modal output devices, including see-through displays, tactile effectors and headset earphones. Further, a network interface is provided to facilitate the receipt and transmission of information to and from the sensors interface, the interface being integrated with communications hardware including radios, ad-hoc networking, multicast/broadcast/unicast message delivery and distributed systems.

Examples.

To better understand the present invention, embodiments and processing of messages using the present invention are set forth in the following examples. In one example, if a primary or secondary database is programmed to receive and translate gestures after the vocal utterance into a microphone by a user of a term, such as "start", the user intending to generate a gesture message would first utter the term "start"; this term would be received by the microphone, translated into a digital signal, and further translated into data by the speech recognition software. The translated data is received at the multi-modal interface (sensor interface) and compared to a database using a processor. In the proposed embodiment, the database would be pre-populated so that the term "start" would correspond to the start of a gesture input, and upon receipt of the translated input data for the term "start", the physical engine associated with the database would generate a digital signal and communicate the same to, for example, (a) the gesture input device to begin generating digital signals representing gestures by movement of the user's gesture input device; (b) to the receiver of the gesture recognition translation software to begin translating signals received from the user's gesture input device, and communicate the same to the multi-modal (sensor) interface; or (c) to the multi-modal (sensor) interface or an agent designed and configured to receive and process inputs from the gesture input device by translating the signals, if necessary, and comparing the same to an applicable database to determine the user's message and take any corresponding action. Until the system transmits a signal to begin detecting, receiving, translating or recognizing gesture input signals or translated signals, some or all of these agents or devices may be idle, ignoring signals that may be transmitted thereto. However, because the system of the present invention is intended to receive messages from users as utterances or gestures, or both, the processors and agents preferably receive and translate all audio and gesture signals from input devices; if the utterance/gesture translates into pre-defined data within the translation software or the sensor interface, then the same translated data is forwarded to a database agent and compared to the database to determine whether a command has been entered, and if so, what action must be taken by the system.

Similarly, if a user desires to transmit a voice-message, he may inform the systems of the present invention to record and transmit the message by another term, such as "speak." In this example, the user intending to generate a voice message would utter the term "speak"; this term would be received by the microphone and translated into a digital signal by the microphone's driver, further translated into data by the speech recognition software, with the input data then being transmitted to the multi-modal (sensor) interface and compared to a database. The database would be pre-populated so that the term "speak" would correspond to the start of a voice message, and upon receipt of the input data for the term "speak" the systems of the present invention would generate a digital signal to begin receiving a voice message communicated by the user by means of the microphone. This digital signal would be transmitted to the microphone, the audio translation software, and/or the processor of the database, to begin recording, receiving and/or processing for transmission the voice message.

In some embodiments a user may desire to control a mobile or inanimate object, such as a light in a room. In this case the user may produce an utterance or generate a movement of the pointer device; as in the examples hereinbefore described, commands may be composed of only a verbal instruction, only a movement of the pointer and/or the gesture input device, or any combination thereof, depending only on the relationship defined between such inputs into the systems of the present invention and the meanings those inputs could have (as defined in the databases). In the case of object control, the location of the user within the system space is determined from the GPS coordinates of the user (transmitted to the system of the present invention by means of the GPS input device), using collision detection algorithms as hereinabove described. For example, if a user says "turn off the light" in a room that only has one light switch (as reflected in the programming of the database), the system of the present invention will determine what room the user is in, and upon determining that there is only one light switch, will not go further to receive or process information regarding the pointer orientation (or if it does, it will discard this information). On the other hand, if the user says "turn off that light," and this utterance is produced by a user located in a room with several light switches controllable by the systems of the present invention, then the system of the present invention will determine the location of the user and the applicable light switches, will retrieve and/or receive the information about the 6DoF vector of the pointer, as hereinabove described, and using collision detection algorithms will determine the light the user has requested be turned off. The system will then transmit a digital signal to the object controlling the light switch to turn off the corresponding light.

Similar to the starting of gesture or voice messages, the user may designate the conclusion of a message with another voice or gesture command, which is received by the input device, transmitted to the processors, and compared to the pre-populated database, so that a digital signal may be generated and transmitted to the input device or another device within the communications chain to designate that the message is complete, and no additional utterances or gestures need be received or processed.

Figure 7:
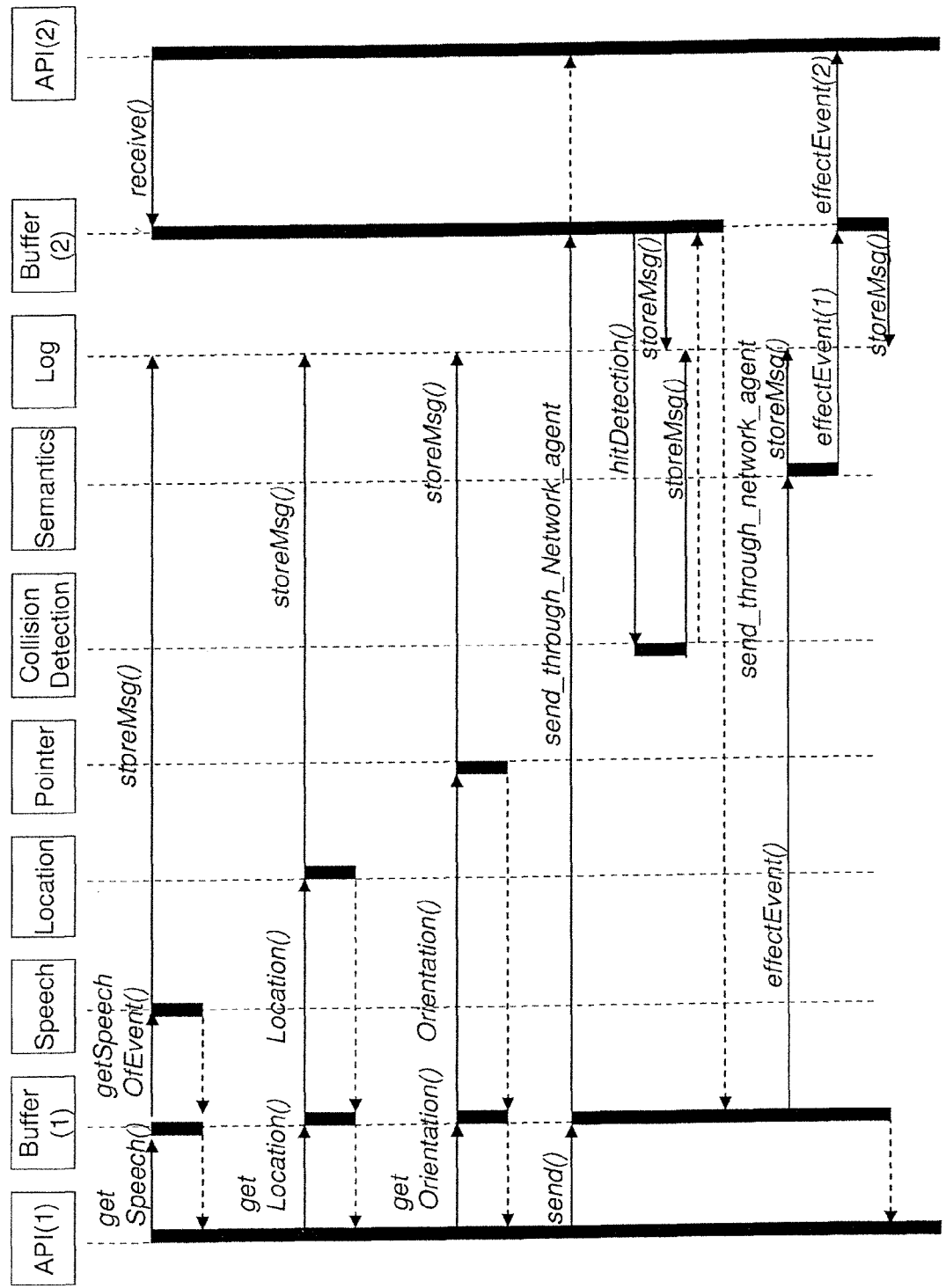
FIG. 7 is another UML sequence diagram of interaction by means of the present invention.

FIG. 3 shows a dynamic view of an embodiment of the present invention. This sequence diagram describes how the system components, or agents, interact, highlighting how such interaction occurs in a qualitative manner every time an event is detected by the systems of the present invention. Specifically, speech may initiate the sequence, in which case electronic signals representing speech are transmitted to, and received by, the multi-modal interface; the interface compares the input to a database, determines that the speech command requires the user's location, pointer device orientation, and gesture commands are to be obtained as well, and the physical engine associated with such database then requests and obtains the user's location (GPS coordinates), and requests and obtains pointer orientation information. Gesture pattern information is then requested and obtained from the gesture input device of the user, and from this information gathered and obtained through the multi-modal interface, a message is derived from the gesture pattern. The speech, location, orientation, and gesture pattern (and the message generated therefrom) are all stored in a log. The sequence is then transmitted to the collision detection agent, and collision detection is determined; upon affirmation of collision detection, the final message (comprising a tagged object or location) is transmitted to the sensor output interface, and a message is distributed in accordance with the instructions preprogrammed or sent with the message from the user. A similar embodiment is shown in FIG. 7.

FIG. 5 shows a battlefield collective operation where systems of the present invention can both fill the gap for non-line-of-sight coordination and shift the way current situational awareness is generated and shared among lower echelon soldiers. When the soldier "clicks" the system (i.e., gives a voice command or specific movement of the pointer), the system determines that the soldier desires to tag an object. Once the soldier aims to the object, he makes another predefined "click" to mark the object. Using the soldier's location, the pointer's orientation, and a 3D model of the surroundings, the object is identified using the collision detection algorithms hereinabove described. The object is then marked on the soldier's see-through display to let him know the tagging worked as expected; otherwise, he might fine-tune or repeat it. Once the object is acknowledged by the soldier, he can complete the annotation/message and broadcast it to his teammates so they become aware of it. The information presented to each member of the team is context-sensitive; in other words, each member of the team "sees" the tagged object only when his field of view includes the geo-tempo-registered tag (the system monitoring the field-of-view of the various members). Sound or iconic clues can be designed for when the object is not within the field of view of a user (refer back to the arrow in the upper right-hand corner of FIG. 4, as an example).

Logs/Messages.

Another component of the multi-modal application interface is the message manager. This module/agent is responsible for the logging and distribution of messages derived and generated through the interaction by or among users, mediated by the interface and the systems and agents of the present invention. This module may use any communications or radio system available to send/receive messages to and from other team members.

This agent/server receives a copy of every message transmitted through and facilitated by the system, and monitors the processes triggered by any object-user flows. For this purpose the message server/agent preferably utilizes threshold times for each step of each process, which are defined parametrically. Furthermore, this message server/agent allows the system to keep record of every action taken for each event occurring in the natural context of the object-users, and thereby the system will be able to reproduce the dynamics generated through the systems of the present invention. This feature allows the applications running on top of the systems of the present invention to be useful for training and/or educational purposes (by reconstructing the application runs).

Voice messages are typically stored in the databases of the present invention, with a visual, tactile or auditory announcement being transmitted to other users with a link to the voice message. However, a voice message could be transmitted to users for immediate play, or for storage in any media storage device on their person. To retrieve these voice messages, the user may give another verbal command or a gesture, which will be transcribed, transmitted to the processor, and compared in a database to a command to playback the voice-message; a digital signal is then generated and sent to the media storage device to cause the message to play.

The invention claimed is:

1. A flexible, multi-modal system useful in communications among users, capable of synchronizing real world and augmented reality, wherein the system is deployed in centralized and distributed computational platforms, the system comprising:

(a) a plurality of communication devices that transmit signals representing the location of a user, speech from a user, and gestures of a user, and that receive signals representing information;

(b) a plurality of agents that receive signals from one or more of said communication devices, translate said signals into system-specific data, and compare said data to a database to determine further action of the system, wherein said further action comprises (i) obtaining additional information from one of the said communication devices; (ii) sending a message to another of said communication devices; or (iii) controlling an object that receive signals from the system of the present invention; wherein at least one of the agents generates signals representing meanings as defined by the database, and transmits the signals to a multi-modal interface having a modifiable default mode for types of signals received or generated thereby; and wherein at least one of the agents is a location-monitoring agent that modifies the default mode of the multi-modal interface to another mode based upon the location changes of users, and communicates said modification to the multi-modal interface to modify the default mode of signals generated thereby; and wherein at least one agent is located on computing hardware remote from at least one other agent; and (c) wherein the plurality of agents further comprise:

(i) a mapping agent, said agent comprising a geographical internal space being defined by relative local coordinates; said mapping agent receiving location information from one of said communication devices, and translating the same to system relative local coordinates; and (ii) a collision detection agent, said agent being coupled with a database comprising known objects or structures and their location in the geographical internal space, wherein said agent receives orientation, azimuth and pitch information from the multi-modal interface or another agent, and location information from the multi-modal interface or the mapping agent, and using the location information and the direction information, determines which objects if any are intersected by a ray in the azimuth and pitch of the direction information, originating from a vector of the location information.

2. The system of claim 1, wherein the collision detection agent also receives range information from a range finder input device, and wherein said mapping agent stores an object in the database based upon the said direction information, location information and range information.

3. The system of claim 2, wherein object locations are organized into a search tree.

4. The system of claim 1, wherein the mapping agent and the collision detection agent receive and transmit signals comprising a tagged object.

5. The system of claim 4, wherein the system transmits the signal comprising the tagged object to the user for confirmation, adjustment or rejection, prior to transmission of the signal to other communication devices.

6. The system of claim 1, wherein said location-monitoring agent receives periodic signals representing location information of users, said signals being generated by one of said communication devices located on a user and transmitted to the multi-modal interface for further transmission to the location-monitoring agent, wherein said agent monitors location changes of users, and in association with a database generates signals for transmission to one or more output devices based upon some location changes of users.

7. The system of claim 1, further comprising a plurality of output devices that receive and process signals from the multi-modal interface, some of said signals representing messages to be communicated by means of an output device in visual, auditory, or tactile modes.

\* \* \* \* \*